United States Patent
Deleon et al.

(10) Patent No.: US 12,215,513 B2
(45) Date of Patent: Feb. 4, 2025

(54) ROOF REPAIR DRONE

(71) Applicant: SIKA TECHNOLOGY AG, Baar (CH)

(72) Inventors: Carl Deleon, Brookline, MA (US); Blaise Leeber, Burlington, MA (US)

(73) Assignee: SIKA TECHNOLOGY AG, Baar (CH)

( * ) Notice: Subject to any disclaimer, the term of this patent is extended or adjusted under 35 U.S.C. 154(b) by 540 days.

(21) Appl. No.: 17/265,676

(22) PCT Filed: Sep. 24, 2019

(86) PCT No.: PCT/EP2019/075757
§ 371 (c)(1),
(2) Date: Feb. 3, 2021

(87) PCT Pub. No.: WO2020/064766
PCT Pub. Date: Apr. 2, 2020

(65) Prior Publication Data
US 2021/0300556 A1   Sep. 30, 2021

Related U.S. Application Data

(63) Continuation of application No. 16/140,048, filed on Sep. 24, 2018, now abandoned.

(51) Int. Cl.
*E04G 23/02* (2006.01)
*B33Y 30/00* (2015.01)
(Continued)

(52) U.S. Cl.
CPC .......... *E04G 23/0281* (2013.01); *B33Y 30/00* (2014.12); *B33Y 40/00* (2014.12); *B33Y 80/00* (2014.12);
(Continued)

(58) Field of Classification Search
CPC ... B64C 39/024; E04G 23/0281; B33Y 30/00; B33Y 40/00; B33Y 80/00;
(Continued)

(56) References Cited

U.S. PATENT DOCUMENTS

| | | | | |
|---|---|---|---|---|
| 7,735,752 B1 * | 6/2010 | Songer | ..................... | B64D 1/18 239/69 |
| 8,251,307 B2 * | 8/2012 | Goossen | .................. | B64D 1/22 244/76 R |

(Continued)

FOREIGN PATENT DOCUMENTS

| | | |
|---|---|---|
| CN | 104760280 A | 7/2015 |
| DE | 102015224351 A1 | 6/2017 |

(Continued)

OTHER PUBLICATIONS

Hunt et al; "3D Printing with Flying Robots;" IEEE International Conference on Robotics & Automation; pp. 4493-4499; 2014.
(Continued)

*Primary Examiner* — Medhat Badawi
(74) *Attorney, Agent, or Firm* — Oliff PLC

(57) ABSTRACT

An aerial drone for repairing holes or punctures in a membrane on a roof, characterized in that the aerial drone comprises at least one camera for recording a section of the membrane, an applicator adapted to apply material onto the section of the membrane, wherein the applicator is controllable wirelessly from a different altitude and/or the ground.

8 Claims, 1 Drawing Sheet

(51) Int. Cl.
  *B33Y 40/00* (2020.01)
  *B33Y 80/00* (2015.01)
  *B64U 101/26* (2023.01)
  *B64U 101/30* (2023.01)

(52) U.S. Cl.
  CPC ...... *B64U 2101/26* (2023.01); *B64U 2101/30* (2023.01); *B64U 2201/10* (2023.01); *B64U 2201/20* (2023.01)

(58) Field of Classification Search
  CPC ............ B64U 2101/30; B64U 2201/10; B64U 2201/20; B64U 2101/00; B29C 73/02; B29C 73/24
  See application file for complete search history.

(56) References Cited

U.S. PATENT DOCUMENTS

| | | | | |
|---|---|---|---|---|
| 10,011,352 | B1* | 7/2018 | Dahlstrom | B64C 39/022 |
| 10,023,323 | B1* | 7/2018 | Roberts | B64U 10/13 |
| 10,329,016 | B1* | 6/2019 | Jackson | G08G 5/0069 |
| 11,118,573 | B2* | 9/2021 | Badger | B29C 73/04 |
| 11,235,890 | B1* | 2/2022 | Dahlstrom | B64U 10/60 |
| 11,529,777 | B2* | 12/2022 | Hafenrichter | C08J 5/12 |
| 11,630,459 | B2* | 4/2023 | Georgeson | B25J 15/0616 |
| | | | | 701/3 |
| 2007/0262195 | A1* | 11/2007 | Bulaga | B64C 27/20 |
| | | | | 244/12.4 |
| 2011/0212254 | A1* | 9/2011 | Morton | B63B 59/00 |
| | | | | 451/75 |
| 2011/0315810 | A1* | 12/2011 | Petrov | B64U 10/60 |
| | | | | 244/17.11 |
| 2013/0025484 | A1* | 1/2013 | Faber | B41K 1/02 |
| | | | | 101/335 |
| 2013/0134254 | A1* | 5/2013 | Moore | B64C 39/022 |
| | | | | 244/17.11 |
| 2014/0316614 | A1* | 10/2014 | Newman | G05D 1/102 |
| | | | | 705/26.4 |
| 2015/0041598 | A1* | 2/2015 | Nugent | H02J 7/0042 |
| | | | | 244/53 R |
| 2015/0274294 | A1* | 10/2015 | Dahlstrom | E04G 23/002 |
| | | | | 239/722 |
| 2015/0344136 | A1* | 12/2015 | Dahlstrom | G05D 1/0866 |
| | | | | 239/722 |
| 2016/0082460 | A1* | 3/2016 | McMaster | B64U 10/14 |
| | | | | 239/722 |
| 2016/0339633 | A1* | 11/2016 | Stolyarov | B33Y 70/00 |
| 2017/0113799 | A1* | 4/2017 | Kovac | B64C 25/00 |
| 2017/0274988 | A1* | 9/2017 | Nguyen | B64U 60/20 |
| 2017/0291439 | A1* | 10/2017 | Koyata | B64D 47/08 |
| 2018/0067493 | A1* | 3/2018 | Pilskalns | B64D 47/08 |
| 2018/0068567 | A1* | 3/2018 | Gong | G05D 1/106 |
| 2018/0129881 | A1* | 5/2018 | Seeber | G06V 10/25 |
| 2018/0134387 | A1* | 5/2018 | Kovac | B29C 64/393 |
| 2018/0312276 | A1* | 11/2018 | Miller | B64F 1/125 |
| 2018/0368416 | A1* | 12/2018 | Shih | C04B 38/0615 |
| 2019/0168875 | A1* | 6/2019 | Ashur | B08B 3/024 |
| 2019/0338759 | A1* | 11/2019 | Badger | B29C 73/02 |
| 2020/0094958 | A1* | 3/2020 | De Leon | E04G 23/0281 |
| 2020/0207462 | A1* | 7/2020 | Kim | B64C 39/024 |
| 2021/0300556 | A1* | 9/2021 | Deleon | B64C 39/024 |
| 2022/0097352 | A1* | 3/2022 | Leeber | B32B 27/306 |
| 2022/0126516 | A1* | 4/2022 | Kutchko | B29B 7/7457 |
| 2022/0339913 | A1* | 10/2022 | Xu | B32B 27/322 |
| 2022/0411052 | A1* | 12/2022 | Angelucci | B64U 30/297 |

FOREIGN PATENT DOCUMENTS

| | | |
|---|---|---|
| JP | 2017-177978 A | 10/2017 |
| WO | 2018/061112 A1 | 4/2018 |
| WO | 2018/113875 A1 | 6/2018 |

OTHER PUBLICATIONS

Dec. 10, 2019 International Search Report issued in International Patent Application No. PCT/EP2019/075757.

Dec. 10, 2019 Written Opinion issued in International Patent Application No. PCT/EP2019/075757.

* cited by examiner

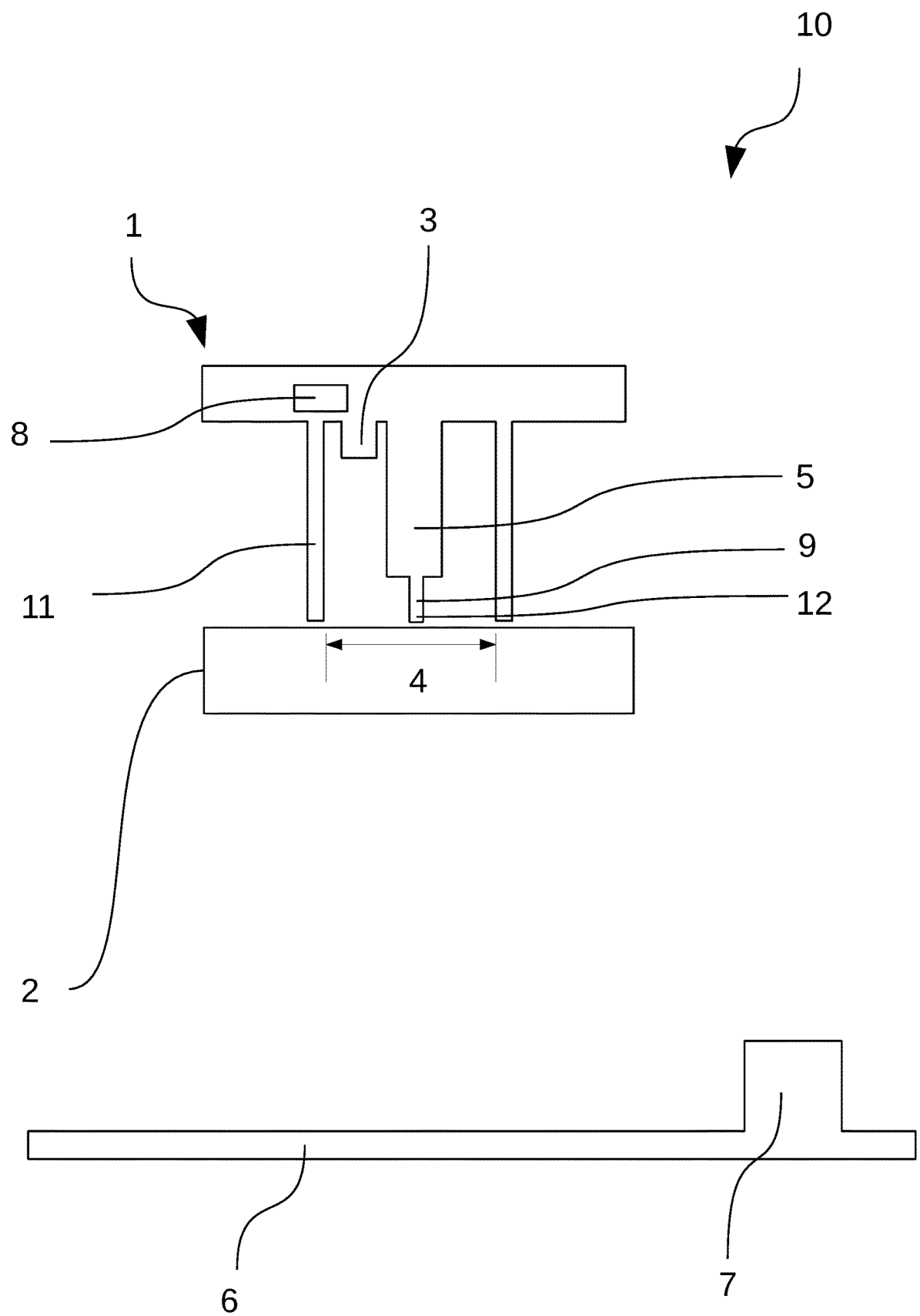

ROOF REPAIR DRONE

The present invention describes an aerial drone for repairing holes or punctures in a membrane on a roof, a system for repairing holes or punctures in a membrane on a roof, and a method for repairing holes or punctures in a membrane on a roof.

Flat roofs are commonly waterproofed against the penetration of water by using prefabricated thermoplastic single- and multi-ply membranes, which are most often based on TPOs (thermoplastic olefins), PVC, or EPDM. An alternative to such prefabricated membranes are liquid applied membranes (LAMs) which are based on 1-component or 2-component reactive compositions. Liquid applied membranes, e.g. on the basis of polyurethanes (PUs) or silicones, cure after their application in order to gain their final physical properties. Due to age, accidental damages, or harsh environmental conditions such as hailstorms, waterproofing membranes may become punctured and have holes, which should be repaired in order to ensure the waterproofing properties of the membrane.

Currently, holes in PVC roofs can be repaired by patching the damaged area with new membrane welded over the damaged area. To do so, a worker needs to climb on the roof.

One major problem associated with repairing roofs is the risk of injury to workers on the roof. According to OSHA (https://www.osha.gov/oshstats/commonstats.html), 384 of the deaths in the construction industry in 2016 were as a result of falls. And according to Dong et al. (Journal of safety research 44, 2013, 17-24), one third of fatal falls in the construction industry are roof falls. Therefore, reducing the need for workers to go on to roofs will decrease the risk of falling and hopefully reduce the number of deaths and injuries caused by roof falls.

Therefore, it is an object of the present invention to provide means for repairing holes or punctures in a membrane on a roof, which reduce the need for workers to be on roofs and which automate the roof repair and maintenance process.

The object is solved by an aerial drone for repairing holes or punctures in a membrane on a roof, characterized in that the aerial drone comprises at least one camera for recording a section of the membrane and an applicator adapted to apply material onto the section of the membrane, wherein the applicator is controllable wirelessly from a different altitude and/or the ground.

The present invention provides an unmanned aerial drone (such as an octocopter) that carries a tool that can be controlled remotely and operated to repair small holes or punctures in the membrane on a roof. The tool that is carried is an applicator, for example a 3D (three dimensional) printer, such as a fused deposition modeling (FDM) 3D printer capable of printing directly onto the surface of the roof. Aerial drones are well known in the art and the basic setup of the aerial drone does not need to be explained here. The aerial drone, respectively the drone, of the invention comprises elements and functions of commercially available aerial drones. However, the aerial drone of the invention additionally comprises features and components named in claim 1. The invention allows repairs to be performed remotely from the safety of the ground, or automatically performed by an autonomous drone capable of detecting damage and depositing a patch to repair the membrane on the roof.

The explanations, embodiments, and advantages of specific embodiments explained for the aerial drone according to the invention also relate to the system according to the invention and to the method according to the invention and vice versa, unless something else is clear from the description.

Preferably, the applicator, such as a 3D printer, is attached to the bottom (side) of the aerial drone. Preferably, the applicator, such as a 3D printer, is attached to the bottom (side) of the aerial drone such that the applicator is centered between the legs of the drone in landing position.

In specific embodiments, the at least one camera for recording a section of the membrane is adapted to record after landing of the aerial drone on the membrane on the roof.

In specific embodiments, the at least one camera for recording a section of the membrane is adapted to record only after landing of the aerial drone on the membrane on the roof.

For an effective use of the applicator, it is necessary to record the section of the membrane with holes or punctures. Based on the recordings, the aerial drone can control the printing itself or print under external control.

In specific embodiments, the at least one camera for recording a section of the membrane is adapted to be part of the aerial drone's flight system. This means the recordings of the camera are used for flying of the aerial drone and/or directing the aerial drone's movement.

Preferably, the section of the membrane onto which the applicator is adapted to apply the material, is the section of the membrane with holes or punctures.

In preferred embodiments, the at least one camera for recording a section of the membrane is adapted to record a section of the membrane on the roof between the legs of the drone in landing position.

In specific embodiments, the at least one camera for recording a section of the membrane is adapted to be focused on a level corresponding to a level on which the distal ends of the legs of the aerial drone are in landing position.

In specific embodiments, the at least one camera for recording a section of the membrane is adapted to record the membrane during flight of the aerial drone. This embodiment is useful to detect holes or punctures in a membrane on a roof using the aerial drone.

In specific embodiments, the at least one camera for recording a section of the membrane is one camera.

This embodiment saves weight, which allows a longer flight time for the aerial drone and/or saves weight for other features.

In preferred embodiments, the applicator is controllable wirelessly from a different altitude and/or the ground.

In preferred embodiments, the applicator is controlled wirelessly from a different altitude and/or the ground.

Further embodiments are described in the dependent claims.

In specific embodiments, the aerial drone comprises at least one on-board communication unit, wherein the at least one on-board communication unit is adapted to wirelessly receive commands for the applicator from a ground based communication unit and optionally to transfer the commands to the applicator.

The on-board communication unit allows that the applicator can be controlled from a ground based communication unit. The on-board communication unit preferably is an integral component of the applicator or more preferably is a separate component that transfers the received commands via a link, e.g. a cable.

In specific embodiments, the aerial drone comprises at least one on-board communication unit, wherein the at least one on-board communication unit is adapted to receive recordings from the at least one camera and to wirelessly send the recordings to a ground based communication unit. The at least one on-board communication unit allows that recordings from the at least one camera can be sent to a ground based communication unit. Thus, the section of the membrane can be observed before, during, and after application of the material.

In specific embodiments, the aerial drone comprises at least one on-board communication unit, wherein the at least one on-board communication unit is adapted to wirelessly receive commands for the applicator from a ground based communication unit and optionally to transfer the commands to the applicator and wherein the at least one on-board communication unit is adapted to receive recordings from the at least one camera and to wirelessly send the recordings to a ground based communication unit. The combination of these features allows a good control and observation of the membrane and the application process from the ground based communication unit.

In specific embodiments, the at least one camera for recording a section of the membrane is one camera and the at least one on-board communication unit is one on-board communication unit. In specific embodiments, the at least one on-board communication unit is one on-board communication unit.

These embodiments save weight, which allows a longer flight time for the aerial drone and/or saves weight for other features.

In preferred embodiments, the at least one camera for recording a section of the membrane is adapted to provide recordings to the at least one on-board communication unit.

In preferred embodiments, the applicator is a 3D printer, preferably a fused deposition modeling 3D printer. In preferred embodiments, the applicator is a fused deposition modeling 3D printer capable of printing using a filament or capable of printing using pellets. In specific embodiments, the applicator is a fused deposition modeling 3D printer capable of printing using a filament. In specific embodiments, the applicator is a fused deposition modeling 3D printer capable of printing using pellets. In specific embodiments, the fused deposition modeling 3D printer is a pellet extruder.

In preferred embodiments, the applicator is a fused deposition modeling 3D printer, which is controllable wirelessly from a different altitude and/or the ground. In preferred embodiments, the applicator is a fused deposition modeling 3D printer, which is controlled wirelessly from a different altitude and/or the ground. A fused deposition modeling 3D printer is light and suitable to directly print from its nozzle onto a surface such as the membrane. The nozzle can be moved swiftly in order to print on a larger portion of the section.

In preferred embodiments, the applicator is capable of applying the material directly onto the surface of the roof. In preferred embodiment, the applicator is a 3D printer and the 3D printer is capable of printing directly onto the surface of the roof. In preferred embodiments, the nozzle of the 3D printer is capable of printing directly onto the surface of the roof.

In preferred embodiments, the aerial drone respectively the applicator comprises applicator material. In preferred embodiments, the applicator is a 3D printer and the aerial drone respectively the 3D printer comprises printing material.

The term "filament" is known in the art and describes printing material that is used by a fused deposition modeling 3D printer in order to print. A pellet extruder can be used as fused deposition modeling 3D printer. Such pellet extruders and pellets are well known in the art and pellets are printing material that can be used by the fused deposition modeling 3D printer in order to print. The printing material is fed into the hot end respectively nozzle of the fused deposition modeling 3D printer and runs molten from the nozzle on the surface to be printed.

In specific embodiments, the applicator is a 3D printer, preferably a fused deposition modeling 3D printer and the aerial drone respectively the 3D printer comprises at least one filament (as printing material). The filament is adapted to be fed into the hot end respectively nozzle of the fused deposition modeling 3D printer. The filament is preferably stored on a spool. Preferably the filament is a flexible filament. Preferably the filament is a flexible filament, which is stored on a spool. Preferably, the filament is of a thickness of 1.25 mm to 3.5 mm.

Flexible filaments, which can be stored on a spool, save space on the aerial drone.

In specific embodiments, the applicator is a 3D printer and the aerial drone respectively the 3D printer comprises pellets (as printing material).

In specific embodiments, the aerial drone respectively the applicator, preferably the 3D printer, comprises applicator material, preferably printing material, wherein the applicator material, preferably the printing material, preferably contains polyvinyl chloride and/or polyurethane and/or thermoplastic olefin and/or polyolefin and/or ethylene propylene diene monomer rubber and/or bitumen. Polyvinyl chloride and/or polyurethane and/or thermoplastic olefin and/or polyolefin and/or ethylene propylene diene monomer rubber and/or bitumen is compatible with the material of roofing membranes and with liquid applied membranes and has waterproofing properties.

Thermoplastic olefins (TPO) are specific types of heterophasic polyolefin compositions. These are blends of a high-crystallinity "base polyolefin", typically having a melting point of 100° C. or more, and a low-crystallinity or amorphous "polyolefin modifier", typically having a glass transition temperature of −20° C. or less. The heterophasic phase morphology consists of a matrix phase composed primarily of the base polyolefin and a dispersed phase composed primarily of embedded particles of the polyolefin modifier. Suitable thermoplastic olefins are commercially available, for example, under the trade names of Adflex®, Adsyl®, Clyrell®, Hifax®, Hiflex®, and Softell®. Further suitable thermoplastic olefins that are commercially available include, for example, the heterophasic ethylene-propylene random copolymers, which are available under the trade name of Borsoft®, such as Borsoft® SD233 CF (from Borealis Polymers). Suitable polyolefins include, for example polyethylene, polypropylene, ethylene/α-olefin copolymers, propylene/ethylene copolymers, and propylene/α-olefin copolymers.

In specific embodiments, the aerial drone respectively the applicator, preferably the 3D printer, comprises applicator material, preferably printing material, wherein the applicator material, preferably the printing material, preferably contains polyvinyl chloride and/or polyurethane and/or thermoplastic olefin and/or polyolefin and/or ethylene propylene diene monomer rubber and/or bitumen and/or PLA (Polylactide).

In specific embodiments, the aerial drone respectively the applicator, preferably the 3D printer comprises applicator material, preferably printing material, wherein the applicator material, preferably the printing material, preferably contains polyvinyl chloride and/or polyurethane and/or thermoplastic olefin and/or polyolefin and/or ethylene propylene diene monomer rubber and/or bitumen.

In specific embodiments, the aerial drone respectively the applicator, preferably the 3D printer comprises applicator material, preferably printing material, containing polyvinyl chloride and/or polyurethane. In specific embodiments, the applicator material, preferably the printing material containing polyvinyl chloride and/or polyurethane is heat stabilized up to temperatures of 300° C. or 280° C.

It has been found that temperatures of 190° C. to 300° C., preferably 210° C. to 260° C., are required at the hot end of the 3D printer in order to print using (flexible) filaments from polyvinyl chloride. It has been found that heat stabilization allows printing using (flexible) filaments from polyvinyl chloride by prevention of thermal degradation.

In specific embodiments, the aerial drone comprises several applicator materials, preferably printing materials, optionally containing different materials.

The verb "to contain" and its conjugations include the verb "to consist of" and its conjugations. The verb "to comprise" and its conjugations include the verb "to consist of" and its conjugations.

In specific embodiments, the aerial drone has a weight of 1 kg to 25 kg, preferably 4 kg to 16 kg, more preferably 7 kg to 13 kg, most preferably 9 kg to 12 kg.

The inventors have prepared an aerial drone that can solve the technical problem, i.e. an aerial drone for repairing holes or punctures in a membrane on a roof. Surprisingly, the number of components and the sum of the weight of all components was successfully minimized to the given weight range. As a result, the aerial drone with all its features (and tools) has a weight, which can be driven by a battery for a sufficient operation/flight time.

In specific embodiments, the aerial drone comprises at least one battery unit with a sum of electric charge of 14000 mAh to 30000 mAh, preferably 19000 mAh to 27000 mAh, for providing power to at least one motor of the drone. The sum of electric charge of 14000 mAh to 30000 mAh, preferably 19000 mAh to 27000 mAh, describes how much electric charge is available from the battery respectively all batteries of the aerial drone for driving the motor respectively all motors of the aerial drone. This electric charge preferably refers to the electric charge available to the at least one motor of the drone, and not to the applicator, preferably the 3D printer, camera etc. The inventors have prepared an aerial drone that can solve the technical problem, i.e. an aerial drone for repairing holes or punctures in a membrane on a roof. The inventors have found the optimal electric charge required to drive the aerial drone, which is a compromise between a too heavy but powerful battery and a light but insufficient battery. As a result, the aerial drone with all its features (and tools) can be driven by a battery with an optimal weight for a sufficient operation/flight time.

In specific embodiments, the aerial drone has a weight of 1 kg to 25 kg, preferably 4 kg to 16 kg, more preferably 7 kg to 13 kg, most preferably 9 kg to 12 kg, and the aerial drone comprises at least one battery unit with a sum of electric charge of 14000 mAh to 30000 mAh, preferably 19000 mAh to 27000 mAh, for providing power to at least one motor of the drone. The sum of electric charge of 14000 mAh to 30000 mAh, preferably 19000 mAh to 27000 mAh, describes how much electric charge is available from the battery respectively all batteries of the aerial drone for driving the motor respectively all motors of the aerial drone. This electric charge preferably refers to the electric charge available to the at least one motor of the drone, and not to the applicator, preferably the 3D printer, camera etc. As a result, the aerial drone with all its features (and tools) has a weight for which the electric charge of the battery is optimal for a sufficient operation/flight time.

In specific embodiments, the at least one on-board communication unit is a microcomputer, preferably a single-board computer or a Raspberry Pi, with an operating system, preferably Octoprint, installed. If the at least one on-board communication unit and the applicator, preferably the 3D printer, are not one integral component, the at least one on-board communication unit is connected to the applicator, preferably the 3D printer, preferably via USB cable.

A microcomputer, such as a single-board computer or a Raspberry Pi, is very light, requires little space and can be easily attached to the aerial drone. Further, these require only a small and light battery, which further reduces the weight of the aerial drone.

In specific embodiments, the at least one on-board communication unit is a single-board computer.

In specific embodiments, the at least one on-board communication unit is one on-board communication unit and the sum of the weight of the on-board communication unit and of all cameras for recording the section of the membrane is 1 g to 300 g, preferably 1 g to 150 g, most preferably 1 g to 80 g. This setup further reduces the weight of the aerial drone. Few connecting parts or other heavy and expensive imaging components are required.

In specific embodiments, the at least one on-board communication unit is one on-board communication unit and the at least one camera for recording the section of the membrane is one camera, wherein the on-board communication unit and the camera in sum have a weight of 1 g to 300 g, preferably 1 g to 150 g, most preferably 1 g to 80 g. This setup further reduces the weight of the aerial drone. Few connecting parts or other heavy or expensive imaging components are required.

In specific embodiments, the at least one on-board communication unit is one single-board computer and the sum of the weight of the single-board computer and of all cameras for recording the section of the membrane is 1 g to 300 g, preferably 1 g to 150 g, most preferably 1 g to 80 g. This setup further reduces the weight of the aerial drone. Few connecting parts or other heavy or expensive imaging components are required.

In specific embodiments, the aerial drone comprises one camera for recording a section of the membrane, but no further cameras.

In specific embodiments, one camera for recording a section of the membrane has a weight of 1 g to 20 g, preferably 1 g to 10 g.

In specific embodiments, all cameras of the aerial drone have a total weight of 1 g to 50 g, preferably 1 g to 30 g.

In specific embodiments, the aerial drone is an octocopter.

In specific embodiments, the aerial drone has landing legs with a length of 15 cm to 90 cm, preferably 35 cm to 80 cm.

A further object of the invention is to provide a system for repairing holes or punctures in a membrane on a roof, which reduces the need for workers to be on roofs and which automates the roof repair and maintenance process.

The system comprises an aerial drone according to claims 1 to 7, preferably according to claims 2 to 7, and a ground based communication unit adapted to wirelessly send commands for the applicator, preferably the 3D printer, to the on-board communication unit of the aerial drone and/or adapted to wirelessly receive recordings from the at least one camera via the on-board communication unit. The on-board communication unit and the ground based communication unit are connected by a wireless network. The ground based communication unit is preferably a personal computer, laptop, or smart phone.

The combination of connected on-board communication unit and ground based communication unit allows that recordings from the at least one camera of the aerial drone can be sent to a ground based communication unit. Thus, the section of the membrane can be observed before, during, and after printing. Further, the combination of connected on-board communication unit and ground based communication unit allows that the applicator, preferably the 3D printer, can be controlled precisely from the ground based communication unit. This system reduces the need for workers to be on roofs. The roof repair and maintenance method is fully or at least partially automated. This reduces the risk for the worker, who can work from the ground based communication unit.

In specific embodiments, the on-board communication unit is accessible (remotely) via the wireless network via an operating system installed on the on-board communication unit and optionally on the ground based communication unit. In specific embodiments, the wireless network is a wireless hotspot generated by a smart phone. This allows a quick setup of the system by the human at the site where the membrane and roof is installed.

In specific embodiments, the operating system of the on the on-board communication unit is Octoprint. The on-board communication unit, respectively the single-board computer or Raspberry Pi, is accessible remotely via browser using Octoprint. Thus, it is possible to send print commands to the on-board communication unit. Octoprint also supports single-board computers with camera.

In specific embodiments, the wireless network is a wireless hotspot generated by a smart phone and the operating system of the on the on-board communication unit is Octoprint.

A further object of the invention is to provide a method for repairing holes or punctures in a membrane on a roof, which reduces the need for workers to be on roofs and which automates the roof repair and maintenance process.

The method comprises the steps of detecting at least one hole or puncture in a section of the membrane on the roof, of recording at least the section of the membrane with at least one camera of an aerial drone according to claims 1 to 7, of landing an aerial drone according to claims 1 to 7 on the membrane on the roof such that the applicator, preferably the 3D printer, of the aerial drone can apply the material, preferably print, onto the section of the membrane, in particular onto at least one hole or puncture, and of applying the material, preferably printing, onto the section of the membrane, in particular onto the at least one hole or puncture, using the applicator, preferably the 3D printer, and preferably the applicator material, preferably the printing material, of the aerial drone.

The order of these steps is generally not mandatory. However, the step of application of the material, preferably printing, will be the last of these steps in most embodiments. In particular, the step of detecting and the step of recording may be simultaneous or the recording may take place prior to detecting.

In specific embodiments, the step of detecting at least one hole or puncture in a section of the membrane on the roof is conducted by a human on the roof, by a human using an aerial drone or automatically by an aerial drone.

The step of recording at least the section of the membrane with at least one camera of an aerial drone according to claims 1 to 7 can be done in several manners: In specific embodiments, the at least one camera records after landing of the aerial drone on the membrane on a roof. In specific embodiments, the at least one camera records only after landing of the aerial drone on the membrane on a roof. Preferably, the section has been found to have at least one hole or puncture before landing of the aerial drone. For an effective use of the applicator, preferably the 3D printer, it is necessary that the at least one camera records the section of the membrane with holes or punctures. Based on the recordings, the aerial drone controls the application of the material, preferably the printing, itself or the application of the material, preferably the printing, is controlled externally.

In specific embodiments, the recording of at least the section of the membrane with at least one camera is part of the flying operation of the aerial drone. This means the recordings of the camera are used for flying of the aerial drone and/or directing the aerial drone's movement.

In specific embodiments, the at least one camera for recording a section of the membrane records during flight of the aerial drone. This embodiment is useful to detect holes or punctures in a membrane on a roof.

In specific embodiments, the at least one camera for recording a section of the membrane records a section of the membrane on the roof between the legs of the drone in landing position. Preferably, the section of the membrane onto which the applicator applies the material, preferably the 3D printer prints, is part of the section of the membrane that is recorded by the at least one camera.

In preferred embodiments, the at least one camera for recording a section of the membrane provides recordings to the at least one on-board communication unit.

In preferred embodiments, the at least one camera for recording a section of the membrane provides recordings of at least the section of the membrane to the at least one on-board communication unit.

The step of landing an aerial drone according to claims 1 to 7 on the membrane on the roof is conducted such that the applicator, preferably the 3D printer, of the aerial drone can apply the material, preferably print, onto the section of the membrane, in particular onto at least one hole or puncture. This means that the nozzle of the 3D printer, which preferably is movable, can reach the section of the membrane to be printed on, in particular the at least one hole or puncture.

In preferred embodiments, the method comprises a step at a ground based communication unit of wirelessly receiving recordings of at least the section of the membrane from at least one camera and sending commands for the applicator, preferably the 3D printer, to the applicator, preferably the 3D printer, via at least one on-board communication unit of the aerial drone. The ground based communication unit is preferably a personal computer, laptop, or smart phone. This step allows that the method is precisely controlled by a human at the ground based communication unit, who receives live images from the printing site. The human has no risk of falling from the roof.

In specific embodiments, the method comprises a step at a ground based communication unit of wirelessly receiving recordings of at least the section of the membrane from at least one camera via at least one on-board communication unit of the aerial drone. The ground based communication unit is preferably a personal computer, laptop, or smart phone. This step allows that the method can be supervised by a human at the ground based communication unit, who receives live images from the printing site. The human has no risk of falling from the roof.

In specific embodiments, the method comprises a step at a ground based communication unit of wirelessly sending commands for the applicator, preferably the 3D printer, to the applicator, preferably the 3D printer, via at least one on-board communication unit of the aerial drone. The ground based communication unit is preferably a personal computer, laptop, or smart phone.

In specific embodiments, the method comprises a step of setting up a wireless network, preferably a wireless hotspot using a smart phone, between the on-board communication unit and the ground based communication unit. A wireless network enables communication between the at least one on-board communication unit of the aerial drone and the ground based communication unit. A wireless hotspot can be setup quickly using a smart phone at the site of the building with the roof in order to enable wireless communication.

In specific embodiments, the applicator is a 3D printer and temperature of a hot end of the 3D printer is set to 190° C. to 300° C., preferably 210° C. to 260° C., during printing. It has been found that this temperature is required for extrusion of specific printing materials such as (flexible) filament from polyvinyl chloride.

In preferred embodiments, the method according to the invention is conducted by the aerial drone automatically or is controlled and/or supervised by a human operator at the ground based communication unit.

In preferred embodiments, the membrane on the roof contains polyvinyl chloride and/or polyurethane and/or thermoplastic olefin and/or polyolefin and/or bitumen and/or the membrane on the roof is a liquid applied membrane.

In preferred embodiments, the membrane on the roof contains polyvinyl chloride and/or polyurethane and/or thermoplastic olefin and/or polyolefin.

In preferred embodiments, the membrane on the roof is a liquid applied membrane.

In preferred embodiments, the membrane on the roof is a thermoplastic olefin.

In preferred embodiments, the membrane on the roof contains thermoplastic olefin.

EXAMPLE

With reference to a FIGURE, the invention will be further described in the following.

FIG. 1 shows an aerial drone and a system according to one embodiment of the present invention.

A CoLiDo D1315 FDM 3D printer was employed as 3D printer (5) for this example. The stock baseplate for the 3D printer (5) was replaced with a custom base to allow for direct to surface 3D printing. The custom base is a circular object cut from ¼" Plexiglas with the same diameter as the original base. A large hole was cut in the center of the base to allow for direct to surface printing. Additional holes were drilled in the custom base to allow for the original screws to be used to attach the base to the printer (5).

In normal operation, the 3D printing software prevents the print head 9, 12 of CoLiDo D1315 FDM 3D from moving to a Z-position that is lower than the surface of the print area of the stock baseplate. These restrictions are designed to prevent damage to the print head (9), (12), but make direct to surface printing impossible without further modification to the software or CoLiDo D1315 FDM 3D printer 5.

This issue was resolved by placing three 3D printed blocks over the screw heads on the sliders that move the arms of the printer (5). At the top of each leg of the printer (5) there is a switch that is pushed in by the sliders. When all three switches are engaged the print head is in its home position. The printer (5) orients all of its movement functions based on its home position. Therefore, placing a block between the slider and home switch adjusts the home position to a lower Z-position. This allows one to override the lower Z-position limit and print directly to a surface by placing the appropriately sized block between the slider and switch. Furthermore, the printer (5) can be restored to its default state by removing the blocks from the sliders. Using the blocks a successful direct to surface test print was performed. As a result of these experiments it was confirmed that the 3D printer (5) was configured so that it can print directly onto an existing roof (2).

For first experiments, a PLA (Polylactide) filament with a thickness of 1.75 mm was used. The filament was arranged to be fed from a spool into the CoLiDo D1315 FDM 3D printer (5).

Then, a Raspberry Pi 3 Model B as on-board communication unit (8) and a Raspberry Pi NoIR Camera V2 as camera (3) for recording a section of the membrane were connected. Mudder black aluminum heat sinks for the Raspberry Pi 3 Model B were used.

A TONV Power Bank battery was connected via a male USB to male MicroUSB cable to the Raspberry to power the Raspberry on-board communication unit (8). A TalentCell 12 V Power Bank battery was connected via a DC connector to power the printer (5). The Raspberry Pi 8 and the printer (5) were connected via a USB 2.0 male A to male B cable.

A microcomputer (8) known as a Raspberry Pi was used to enable the 3D printer (5) to receive print commands wirelessly. The Raspberry Pi (8) basically acts as a very small computer that can be attached to the printer (5) and can send print commands via USB cable. The Raspberry Pi (8) can be accessed remotely via browser using an operating system known as OctoPrint. Therefore it is possible to send print commands from a browser window that is opened on a PC (7) or smart phone (7) to the Raspberry Pi (8) over a Wi-Fi network. Once the commands are received by the Pi (8) they can be executed by the printer (5) to print an object.

OctoPrint was installed on the Raspberry Pi (8) by downloading the program and writing the image to an SD card. Inserting the SD card into the Raspberry Pi (8) allows OctoPrint to boot up upon powering up the Raspberry Pi (8).

To receive print commands the Pi 8 must be connected to the same wireless network as another device such as a smart phone (7), or PC (7), or laptop (7). This was achieved by editing a wireless access program file in OctoPrint to allow the Pi 8 to connect to the wireless hotspot generated by an iPhone 7. Once connected, other devices connected to the same wireless hotspot (such as a PC (7) or the iPhone (7) itself) can communicate with the Raspberry Pi (8).

In order to communicate with the Raspberry Pi (8), a browser window is opened and the IP address for the Raspberry Pi (8) is entered into the browser. The IP address for the Raspberry Pi (8) can be determined by connecting the Raspberry Pi (8) to a monitor using an HDMI cable, powering up the Raspberry Pi (8) and logging in using a keyboard connected to the Raspberry Pi (8). The IP address will be displayed on the monitor. Once the correct IP address is entered, the interface for OctoPrint will load in the browser window. From here g-code files can be uploaded and print commands can be given wirelessly. OctoPrint also supports the Raspberry Pi camera (3) and can provide a live feed of the print job. To demonstrate the wireless printing capabilities a small Sika logo was successfully printed.

Once it was confirmed that the printer (5) could successfully receive print commands wirelessly the range of the wireless connection was determined. The printer (5) was placed outside and the Raspberry Pi (8) and a laptop (7) were connected to the wireless hotspot generated by an iPhone (7). The iPhone (7) and the laptop were then moved away from the printer (5). The Raspberry Pi (8) was still connected to the wireless network when it was approximately 200 ft. away from the iPhone (7). A test print was performed at a range of approximately 100 feet and was successful.

As a result of these experiments it was confirmed that the 3D printer (5) is able to receive print commands wirelessly.

Batteries were used to power the 3D printer (5) so that it could operate without being connected to any stationary power sources. This was achieved by acquiring a battery capable of powering the printer (5) and one to power the Raspberry Pi (8) (and the Raspberry Pi camera (3)). The batteries were attached to the printer (5) with Velcro and were used to power the respective devices. A test print was successfully performed using the batteries as a power source. Used in conjunction with the wireless printing capability, the battery power provides mobility to the 3D printer (5) that is required for its use as a component of a 3D printer drone (1).

As a result of these experiments it was confirmed that the 3D printer (5) can be battery powered.

In order to repair damage to PVC membrane it is necessary to patch the damaged area with new flexible PVC, or some other compatible material such as the polyurethanes used in the liquid applied membranes. Polylactide (PLA) can also be an option in certain cases.

As an aerial drone a DJI Spreading Wings S1000+ drone with DJI A2 flight control system Futaba T14SG radio controller, Tattu 22000 mAh 6C LiPo battery, MaxAmps 24 V power supply, Hyperion EOS 0840i 1000 W charger, and CineMilled DJI S1000/Ronin-M Extended Carbon Fiber Landing Gear was employed in this example.

To the bottom of the aerial drone the above modified CoLiDo D1315 FDM 3D printer (5) was attached. The printer (5) was attached to the gimbal mount of the drone using heavy duty cable ties. Two cable ties were wrapped around each of the three legs of the printer and the gimbal mounting base. The ties were tightened as much as possible and the printer was found to be tightly attached. A mechanism such as screwing the top plate of the 3D printer to the gimbal mounting base may also be employed. All other components were attached as well using standard means such as Velcro, glue, etc. According to the manual for the DJI Spreading Wings S1000+ drone, the maximum takeoff weight for the drone is 11 kg.

The takeoff weight of the drone (1) fully loaded with the modified 3D printer, battery, and all other components is just about 11 kg. A 22000 mAh battery was attached to the drone such that it powers the motors of the drone (1). A test flight was successfully performed with a takeoff weight of the drone of about 9 kg. After about 8 minutes of flight time, less than half of the battery power was consumed. Therefore, it has been shown that the drone is powerful enough to lift the modified 3D printer (5) and all required components with an optimized weight for a sufficient amount of time in order to repair the membrane on a roof.

In summary, the inventors have developed means, i.e. a drone 1, a system 8, and a method 10, for repairing holes or punctures in a membrane on a roof 2, which reduce the need for workers to be on roofs and which automate the roof repair and maintenance process.

REFERENCE NUMBER LIST 1 aerial drone according to the invention
2 roof (with membrane)
3 camera
4 section of the membrane
5 3D printer
6 ground
7 ground based communication unit
8 on-board communication unit
9 hot end (of 3D printer)
10 system according to the invention
11 leg of the drone (landing position)
12 nozzle (of 3D printer)

The invention claimed is:

1. An aerial drone for repairing holes or punctures in a membrane on a roof, the aerial drone comprising:
a drone body configured with a motor and propeller;
at least one camera mounted on the drone body, the camera configured to record a section of the membrane,
an applicator oriented vertically and configured to apply material vertically onto the section of the membrane from a nozzle,
a plurality of legs supporting the applicator and the drone, the plurality of legs configured to support the applicator on sliders attached to each leg such that the applicator is attached to the sliders and is configured to slide in a z-direction along the plurality of legs, each of the plurality of legs having a lowermost point,
wherein
the applicator is controllable wirelessly from a different altitude and/or the ground,
the applicator is slidably mounted on the sliders such that the applicator is configured to slide in the z-direction independent of the drone body such that the nozzle is able to reach to a point approximately even in the z-direction with the lowermost point of each of the plurality of legs,
and
the applicator material contains polyvinyl chloride and/or thermoplastic olefin and/or polyolefin and/or ethylene propylene diene monomer rubber and/or bitumen.

2. The aerial drone according to claim 1, further comprising at least one on-board communication unit, wherein the at least one on-board communication unit is configured to wirelessly receive commands for the applicator from a ground based communication unit and/or to transfer the commands to the applicator and/or wherein the at least one on-board communication unit is configured to receive recordings from the at least one camera and to wirelessly send the recordings to a ground based communication unit.

3. The aerial drone according to claim 1,
wherein
the applicator is a 3D printer which is controlled wirelessly from a different altitude and/or the ground.

4. The aerial drone according to claim 1, further comprising applicator material containing polyvinyl chloride, the applicator material is heat stabilized up to temperatures of 300° C. or 280° C.

5. The aerial drone according to claim 1,
wherein
the aerial drone has a weight of 1 kg to 25 kg, and/or the aerial drone comprises at least one battery unit with a sum of electric charge of 14000 mAh to 30000 mAh for providing power to at least one motor of the drone.

6. The aerial drone according to claim 2,
wherein
the at least one on-board communication unit is one single-board computer and the sum of the weight of the single-board computer and of all cameras for recording the section of the membrane is 1 g to 300 g.

7. A system for repairing holes or punctures in a membrane on a roof, the system comprising:
an aerial drone according to claim 2, and
a ground based communication unit configured to wirelessly send commands for the applicator to the on-board communication unit of the aerial drone and/or configured to wirelessly receive recordings from the at least one camera via the on-board communication unit,
wherein the on-board communication unit and the ground based communication unit are connected by a wireless network.

8. The system according to claim 7,
wherein
the wireless network is a wireless hotspot generated by a smart phone.

* * * * *